(12) United States Patent
Takahashi et al.

(10) Patent No.: US 6,573,958 B2
(45) Date of Patent: Jun. 3, 2003

(54) LIGHT-SCATTERING SHEETS AND LIQUID CRYSTAL DISPLAY UNITS

(75) Inventors: Hiroshi Takahashi, Himeji (JP); Yoshiyuki Nishida, Nagareyama (JP); Masaya Omura, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/985,918

(22) Filed: Nov. 6, 2001

(65) Prior Publication Data

US 2002/0080306 A1 Jun. 27, 2002

(30) Foreign Application Priority Data

Nov. 9, 2000 (JP) ........................................ 2000/342072

(51) Int. Cl.⁷ ........................................... G02F 1/1335
(52) U.S. Cl. ...................................................... 349/86
(58) Field of Search ........................................... 349/86

(56) References Cited

U.S. PATENT DOCUMENTS

| | | | | |
|---|---|---|---|---|
| 5,206,747 A | * | 4/1993 | Wiley et al. | 349/86 |
| 5,610,735 A | * | 3/1997 | Ohmae et al. | 349/86 |
| 5,708,487 A | * | 1/1998 | Bergman | 349/86 |
| 5,760,860 A | * | 6/1998 | Mason et al. | 349/86 |
| 6,002,522 A | * | 12/1999 | Todori et al. | 359/573 |
| 6,037,058 A | * | 3/2000 | Clikeman et al. | 428/402.2 |
| 6,215,535 B1 | * | 4/2001 | Nakajima et al. | 349/86 |
| 6,271,898 B1 | * | 8/2001 | Clikeman et al. | 349/86 |

FOREIGN PATENT DOCUMENTS

| | | |
|---|---|---|
| JP | 61-8430 B2 | 3/1986 |
| JP | 63-228887 A | 9/1988 |
| JP | 07-027904 A | 1/1995 |
| JP | 07-098452 A | 4/1995 |
| JP | 07-261171 A | 10/1995 |
| JP | 09-113902 A | 5/1997 |

* cited by examiner

Primary Examiner—James Dudek
(74) Attorney, Agent, or Firm—Birch, Stewart, Kolasch & Birch, LLP

(57) ABSTRACT

A light-scattering sheet of the present invention can be produced by applying a liquid mixture comprising polymers varying in refractive index (e.g., cellulose acetate), evaporating a solvent, and forming a bicontinuous phase structure due to spinodal decomposition. In the sheet, incident light can be scattered isotropically, and the transmitted and scattered light may have a maximum intensity of a scattered light at a scattering angle of 2 to 40°. Therefore, the transmitted light can be scattered with high directionality. A reflective liquid crystal display unit has a liquid crystal cell with a liquid crystal sealed therein, a reflector for reflecting incident light disposed behind the liquid crystal cell, a light-scattering sheet disposed forwardly of the reflecting means and a polarizing plate disposed forwardly of the liquid crystal cell. The light-scattering sheet realizes a reflective liquid crystal display unit capable of assuring a high quality image.

17 Claims, 3 Drawing Sheets

LIGHT-SCATTERING SHEETS AND LIQUID CRYSTAL DISPLAY UNITS

FIELD OF THE INVENTION

The present invention relates to a transmittable light-scattering sheet (or film) useful for assuring a high-luminance display of images in a liquid crystal display unit (in particular, reflective liquid crystal display unit), a method of producing the same, and a reflective liquid crystal display unit utilizing the light-scattering sheet.

BACKGROUND OF THE INVENTION

Recent years have witnessed advances in the construction of infrastructures for telecommunications systems and in the network consolidation of information through the computer-communications equipment integration, such as internets. By such a network consolidation, the access to information is freed from restrictions as to time and place. In order to utilize such networks efficiently, portable information terminals such as PDA (personal digital assistance) have been developed. Moreover, in lieu of notebook-sized personal computers, further-downsized mobile personal computers of reduced thickness and weight are under development.

Since portability is required of these units, it is necessary to reconcile the need for a longer battery operating time with the need for reduced thickness and downsizing of communications units. Therefore, display for use in such portable telecommunications equipment must be of reduced thickness, reduced weight and low power consumption. Particularly for attaining the low power consumption goal, a technology for brightening the display screen by exploiting natural light has been sought for replacing the conventional technology using a backlight. The display mode which is considered to be most promising is a reflecting liquid crystal display unit. Particularly, to keep abreast with the increasing versatility of data accompanying the ever-continuing advances in multimedia, there is a demand for reflecting-mode liquid crystal display units not only capable of large color display and high image-quality (high-definition) display but also of low production cost.

As the reflecting mode liquid crystal display unit, there are known various kinds of units such as TN (Twisted Nematic) and STN (Super Twisted Nematic) units, but for color display and high-definition display, units utilizing a polarizer (one polarizer plate type) are preferred. For example, the R-OCB mode in which the liquid crystal layer is of the HAN (Hybrid Aligned Nematic) alignment has excellent characteristics such as low voltage, wider viewing angle, high-speed response, middle color rendition and high contrast.

In order to insure the uniform brightness of the screen as accompanied with getting a display larger, the scattering function is an important factor. That is, in the reflective liquid crystal display unit, the brightness of the screen is insured in such manner that the light incident on the liquid crystal layer (natural light, ambient light) is efficiently taken in and reflected with a reflector, that the reflected light is scattered to an extent not deteriorating visibility for the prevention of total reflection. When the polarizer and light-scattering sheet are combined, the reflection efficiency can be further improved. Incidentally, as the polarizer, there can be used a light-reflecting back electrode utilizing an electrode as a reflector, and a reflecting plate disposed outside of a support of an electrode. For example, as the reflecting type liquid crystal display unit, in Japanese Patent Application Laid-Open No. 228887/1988 (JP-63-228887A) and Photo-fabrication Symposium '92 sponsored by the Japanese Society of Printing, the fundamental technology about liquid crystal display unit, and the liquid crystal display unit given an enlarged viewing angle of the display surface through the prevention of total reflection by means of adopting a surface-corrugated metal thin film as the back electrode (lower electrode) were introduced.

However, when the display of the reflecting type liquid crystal display unit is to be a color display, a color filter is used in addition to said polarizer. In case a color filter is used, the proportion of loss of reflected light is increased and the above scattering plate system cannot impart enough brightness to the display screen. Particularly, in the color system, it is particularly important to impart high luminance by directing diffused light in a given direction (directed scattering). However, in order to increase this directionality in the scattering-reflector system, it is necessary to precisely control the geometry and distribution pattern of reflector surface irregularities but this is a costly procedure.

For the purpose of insuring a high luminance by scattering reflected light, there has been known a liquid crystal display unit using a transmittable light-scattering sheet in lieu of a scattering reflector. For example, Japanese Patent Publication No. 8430/1986 (JP-61-8430B) discloses a liquid crystal display unit comprising a polarizing layer formed on the front side of a liquid crystal cell and, as formed thereon, a light-scattering layer. However, a resin sheet as polymerized by utilizing holography for imparting directionality to a transmitting type light-scattering sheet is known (The synopsis of Lectures at Japanese Society of Liquid Crystal Science, 1998) but the production process is complicated and costly.

Meanwhile, as a light-scattering sheet with low cost also known is a particle dispersion sheet having an islands-in-an ocean structure composed of resin beads or spheres and a transparent resin. Japanese Patent Application Laid-Open No. 261171/1995 (JP-7-261171A) discloses a display unit having a light scattering layer externally of a liquid cell, specifically a display unit comprising a polarizing film on the outer surface of an electrode plate and, as formed on the surface of the polarizing film, a light-scattering layer comprising a phase-separated dispersion of two or more kinds of resins varying in refractive index. As disclosed in Japanese Patent Application Laid-Open No. 27904/1995 (JP-7-27904A) and Japanese Patent Application Laid-Open No. 113902/1997 (JP-9-113902A), there also are known transmitting type liquid crystal display units such that a particle-scattering sheet having an islands-in-an ocean structure comprised of plastic beads and a transparent resin matrix is interposed between a back light and a liquid crystal cell. As an example of the display unit having a light-scattering layer within the liquid crystal cell, Japanese Patent Application Laid-Open No. 98452/1995 (JP-7-98452A) discloses a display unit comprising a transparent resin layer (light-scattering layer) containing a dispersion of fine particles as interposed between the electrode and substrate sheet (electrode-supporting substrate) of the electrode plate.

However, in these islands-in-an ocean structure sheets, since the resin beads are dispersed randomly in a transparent resin matrix, the scattering light intensity distributes according to Gaussian distribution in principle. Thus, the directionality can not imparted to the light-scattering light, and it is difficult that the brightness is imparted to the display surface. Particularly, in the reflective liquid crystal display unit having a large display screen the particle dispersed sheet can not impart sufficient brightness to the whole display screen and it is difficult to ensure sharp image.

SUMMARY OF THE INVENTION

It is, therefore, an object of the present invention to provide a light-scattering sheet (or film) having high light-scattering properties and capable of imparting directionality to a transmitted and scattered light, a process for producing the light-scattering sheet and a liquid crystal display unit (in particular, reflective liquid crystal display unit) with the use of the light-scattering sheet.

It is another object of the present invention to provide a light-scattering sheet capable of scattering a transmitted light with high directionality, a process for producing the light-scattering sheet, and a liquid crystal display unit (in particular, reflective liquid crystal display unit).

It is still another object of the present invention to provide a light-scattering sheet capable of ensuring high image-quality even in a color display, a process for producing the light-scattering sheet, and a liquid crystal display unit.

It is other object of the present invention to provide a light-scattering sheet capable of assuring high brightness and high precise display of images, a process for producing the light-scattering sheet, and a liquid crystal display unit.

It is yet other object of the present invention to provide a process for producing the light-scattering sheet with convenient and low cost.

The inventors of the present invention did much research to accomplish the above objects and found that by removing or evaporating a solvent from a liquid mixture composed of a plurality of resins varying in refractive index to cause spinodal decomposition, a bicontinuous phase structure which has the regularlity and is substantially isotropic can be easily formed, and that a transmitted light can be scattered with high directionality when the sheet having such a bicontinuous phase structure is used. The present invention has been developed on the basis of the above findings.

Thus, a light-scattering sheet of the present invention comprises a light-scattering layer which comprises a plurality of polymers varying in refractive index and has at least bicontinuous phase structure, wherein the bicontinuous phase structure is formed by spinodal decomposition from liquid phase comprising a plurality of polymers. In the sheet, an incident light can be scattered isotropically, and the transmitted and scattered light may have a maximum intensity of a scattered light at a scattering angle of 2 to 40° and a high total light transmittance (for example, 70 to 100%). In the light-scattering sheet, an average interphase distance of the bicontinuous phase may be about 0.5 to 20 μm, and a difference in refractive index between a plurality of polymers may be about 0.01 to 0.2.

The light-scattering sheet may comprise a transparent support and the light-scattering layer formed on at least one side of the support. In the sheet, the transparent support is optically isotropic.

The present invention also includes a process for forming the light-scattering sheet by removing a solvent from a layer composed of a plurality of polymers varying in refractive index and the solvent to form a bicontinuous phase structure due to spinodal decomposition. In the process, the mixture may be applied on a transparent support and a solvent in the mixture may be evaporated to form a bicontinuous phase structure.

The present invention also includes a reflective liquid crystal display unit which comprises a liquid crystal cell having a liquid crystal sealed therein, a reflecting means for reflecting an incident light disposed behind the liquid crystal cell, and the light-scattering sheet disposed forwardly of the reflecting means. In this unit, a polarizing plate may be disposed forwardly of the liquid crystal cell, and a light-scattering sheet may be disposed between the liquid crystal cell and the polarizing plate.

Throughout this specification, the term "sheets" means, without regard to thickness, a dimensional material thus meaning a film as well.

DETAILED DESCRIPTION OF THE INVENTION

Light-scattering Sheet

Figure 1:
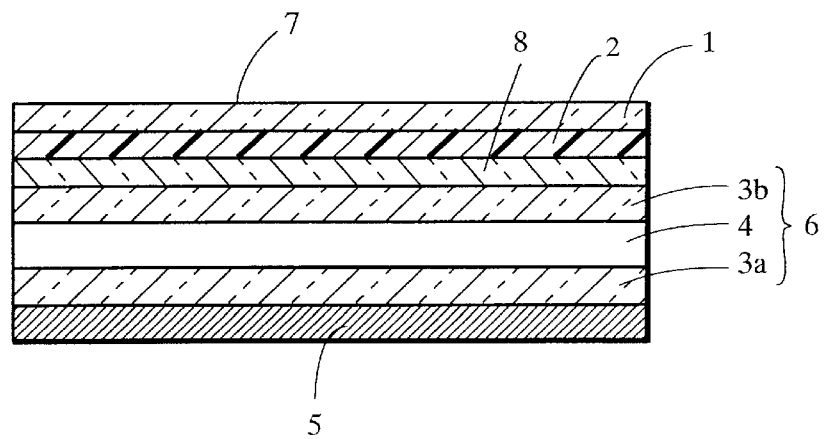
FIG. 1 is a schematic cross-section view showing an example of the liquid crystal display unit of the present invention.

A light-scattering layer constituting a light-scattering sheet (a transmittable light-scattering sheet) comprises a plurality of polymers varying in refractive index, and usually forms a phase separation structure having at least bicontinuous phase structure under an atmosphere for use (in particular, a room temperature of about 10 to 30° C.). The bicontinuous phase structure is formed by spinodal decomposition from a liquid phase composed of a plurality of polymers (e.g. liquid phase at an ordinary temperature, for example, a liquid mixture or a solution). The bicontinuous phase structure usually formed due to spinodal decomposition by evaporating a solvent with the use of composition (e.g., liquid mixture or solution) composed of a plurality of polymers and forming liquid phase at an ordinary temperature. Since the light-scattering layer is formed from liquid phase, the light scattering layer has a uniform and fine bicontinuous phase structure. When such a transmittable light-scattering sheet is used, an incident light scatters with substantially isotropic, and the directionality can be imparted to a transmitted and scattered light. Therefore, both high light scattering properties and high directionality can be satisfied.

For enhancing the light-scattering properties, a plurality of polymers can be employed in such combination that the refractive index difference is for example about 0.01 to 0.2, and preferably about 0.1 to 0.15. When the difference in refractive index is less than 0.01, the intensity of the transmitted and scattered light is declined. When the difference in refractive index is more than 0.2, high directionality can not be imparted to a transmitted and scattered light.

A plurality of polymers can be selected from styrenic resins, (meth)acrylic resins, vinyl ester-series resins, vinyl ether-series resins, halogen-containing resins, olefinic resins (inclusive of alicyclic olefinic resins), polycarbonate-series resins, polyester-series resins, polyamide-series resins, thermoplastic polyurethane-series resins, polysulfone-series resins (e.g., polyether sulfone, polysulfone), polyphenylene ether-series resins (e.g., a polymer of 2,6-xylenol), cellulose derivatives (e.g., cellulose esters, cellulose carbamates, cellulose ethers), silicone resins (e.g., polydimethyl siloxane, polymethyl phenyl siloxane), rubbers or elastomers (e.g., diene-series rubbers such as polybutadiene and polyisoprene, styrene-butadiene copolymer, acrylonitrile-butadiene copolymer, acrylic rubber, urethane rubber, silicone rubber) in suitable combination.

The styrenic resin includes homo- or copolymers of styrenic monomers (e.g. polystyrene, styrene-α-methylstyrene copolymer, styrene-vinyl toluene copolymer) and copolymers of styrenic monomers with copolymerizable monomers (e.g. a (meth)acrylic monomer, maleic anhydride, a maleimide-series monomer, a diene). The styrenic copolymer includes, for example, styrene-acrylonitrile copolymer (AS resin), a copolymer of styrene and a (meth)acrylic monomer [e.g., styrene-methyl methacrylate copolymer, styrene-methyl methacrylate-(meth)acrylate copolymer, styrene-methyl methacrylate-(meth)acrylic acid copolymer], styrene-maleic anhydride copolymer. The preferred styrenic resin includes polystyrene, a copolymer of styrene and a (meth)acrylic monomer [e.g., a copolymer comprising styrene and methyl methacrylate as main component such as styrene-methyl methacrylate copolymer], AS resin, styrene-butadiene copolymer and the like.

As the (meth)acrylic resin, a homo- or copolymer of a (meth)acrylic monomer and a copolymer of a (meth)acrylic monomer and a copolymerizable monomer can be employed. As the (meth)acrylic monomer, there may be mentioned, for example, (meth)acrylic acid; $C_{1-10}$alkyl (meth)acrylates such as methyl (meth)acrylate, ethyl (meth) acrylate, butyl (meth)acrylate, t-butyl (meth)acrylate, isobutyl (meth)acrylate, hexyl (meth)acrylate, octyl (meth) acrylate and 2-ethylhexyl (meth)acrylate; aryl (meth) acrylates such as phenyl (meth)acrylate; hydroxyalkyl (meth)acrylate such as hydroxyethyl (meth)acrylate and hydroxypropyl (meth)acrylate; glycidyl (meth)acrylate; N,N-dialkylaminoalkyl (meth)acrylate (meth)acrylonitrile; (meth)acrylate having an alicyclic hydrocarbon ring such as tricyclodecane. The copolymerizable monomer includes the above styrenic monomer, a vinyl ester-series monomer, maleic anhydride, maleic acid, and fumaric acid. These monomers can be used singly or in combination.

As the (meth)acrylic resin, there may be mentioned poly (meth)acrylates such as polymethyl methacrylate, methyl methacrylate-(meth)acrylic acid copolymers, methyl methacrylate-(meth)acrylate copolymers, methyl methacrylate-acrylate-(meth)acrylic acid copolymers, and (meth)acrylate-styrene copolymers (MS resin). The preferred (meth)acrylic resin includes poly($C_{1-6}$alkyl (meth) acrylate) such as poly(methyl (meth)acrylate) and in particular, methyl methacrylate-series resin comprising methyl methacrylate as main component (about 50 to 100% by weight, preferably about 70 to 100% by weight).

The vinyl ester-series resin includes homo- or copolymers of vinyl ester-series monomers (e.g. polyvinyl acetate, polyvinyl propionate), copolymers of vinyl ester-series monomers with copolymerizable monomers (e.g. ethylene-vinyl acetate copolymer, vinyl acetate-vinyl chloride copolymer, vinyl acetate-(meth)acrylate copolymer) and derivatives thereof. The derivative of the vinyl ester-series resin includes polyvinyl alcohol, ethylene-vinyl alcohol copolymer, polyvinyl acetal resin and the like.

As the vinyl ether-series resins, there may be mentioned a homo- or copolymer of vinyl $C_{1-10}$alkyl ether such as vinyl methyl ether, vinyl ethyl ether, vinyl propyl ether, and vinyl t-butyl ether, a copolymer of vinyl $C_{1-10}$alkyl ether and a copolymerizable monomer (e.g., vinyl alkyl ether-maleic anhydride copolymer).

The halogen-containing resin includes polyvinyl chloride, poly(vinylidene fluoride), vinyl chloride-vinyl acetate copolymer, vinyl chloride-(meth)acrylate copolymer, and vinylidene chloride-(meth)acrylate copolymer.

The olefinic resin includes homopolymers of olefins such as polyethylene and polypropylene, copolymers such as ethylene-vinyl acetate copolymer, ethylene-vinyl alcohol copolymer, ethylene-(meth)acrylic acid copolymer and ethylene-(meth)acrylate copolymer. As the alicyclic olefinic resin, there may be mentioned homo- or copolymers of cyclic olefins such as norbornene and dicyclopentadiene (e.g., a polymer having an alicyclic hydrocarbon group such as tricyclodecane which is sterically rigid), copolymers of the cyclic olefin with a copolymerizable monomer (e.g., ethylene-norbornene copolymer, propylene-norbornene copolymer). The alicyclic olefinic resin can be commercially available as, for example, the trade name "ARTON", the trade name "ZEONEX" an the like.

The polycarbonate-series resin includes aromatic polycarbonates based on bisphenols (e.g. bisphenolA) and aliphatic polycarbonates such as diethylene glycol bisallyl carbonates.

The polyester-series resin includes aromatic polyesters obtainable from an aromatic dicarboxylic acid, such as terephthalic acid (homopolyesters, e.g. poly$C_{2-4}$alkylene terephthalates such as polyethylene terephthalate and polybutylene terephthalate, poly$C_{2-4}$alkylene naphthalates and copolyesters comprising a $C_{2-4}$alkylene arylate unit (a $C_{2-4}$alkylene terephthalate unit and/or a $C_{2-4}$alkylene naphthalate unit) as a main component (e.g., not less than 50% by weight). The copolyester includes copolyesters in which, among constituting units of a poly$C_{2-4}$alkylene arylate, a part of $C_{2-4}$alkylene glycols is substituted with a polyoxy$C_{2-4}$alkylene glycol, a $C_{6-10}$alkylene glycol, an alicyclic diol (e.g., cyclohexane dimethanol, hydrogenated bisphenolA), a diol having an aromatic ring (e.g., 9,9-bis(4-(2-hydroxyethoxy)phenyl)fluorene having a fluorenone side chain, a bisphenolA, bisphenolA-alkylene oxide adduct) or the like, and copolyesters which a part of aromatic dicarboxylic acids is substituted with an unsymmetric aromatic dicarboxylic acid such as phthalic acid and isophthalic acid, an aliphatic $C_{6-12}$dicarboxylic acid such as adipic acid or the like. The polyester-series resin also includes polyarylate-series resins, aliphatic polyesters obtainable from an aliphatic dicarboxylic acid such as adipic acid, a homo- or copolymer of a lactone such as ε-caprolactone. The preferred polyester-series resins are usually non-crystalline polyesters, for example, non-crystalline copolyesters (e.g., $C_{2-4}$alkylene arylate-series copolyesters).

The polyamide-series resin includes aliphatic polyamides such as nylon 46, nylon 6, nylon 66, nylon 610, nylon 612, nylon 11, and nylon 12, a polyamide obtained from a dicarboxylic acid (e.g., terephthalic acid, isophthalic acid, adipic acid) and a diamine (e.g., hexamethylene diamine, m-xylylenediamine). The polyamide-series resin may be homo- or copolymer of a lactam such as ε-caprolactam, and is not limited to a homopolyamide but may be a copolyamide.

Among the cellulose derivatives, the cellulose esters includes, for example, aliphatic organic acid esters (e.g., cellulose acetates such as cellulose diacetate and cellulose triacetate; $C_{1-6}$oraganic acid esters such as cellulose propionate, cellulose butylate, cellulose acetate propionate, and cellulose acetate butylate), aromatic organic acid esters (e.g. $C_{7-12}$ aromatic carboxylic acid esters such as cellulose phthalate and cellulose benzoate), inorganic acid esters (e.g., cellulose phosphate, cellulose sulfate), and may be mixed acid esters such as acetate nitrate cellulose ester. The cellulose derivatives also includes cellulose carbamates (e.g. cellulose phenylcarbamate), cellulose ethers (e.g., cyanoethylcellulose, hydroxy$C_{2-4}$alkyl celluloses such as hydroxyethylcellulose and hydroxypropylcellulose $C_{1-6}$alkyl cellulose such as methyl cellulose and ethyl cellulose; carboxymethyl cellulose or a salt thereof, benzyl cellulose, acetyl alkyl cellulose).

The preferred polymer includes, for example, styrenic resins, (meth)acrylic resins, vinyl ester-series resins, vinyl ether-series resins, halogen-containing resins, alicyclic olefinic resins, polycarbonate-series resins, polyester-series resins, polyamide-series resins, cellulose derivatives, silicone-series resins, rubbers or elastomers, and the like. As a plurality of polymers, a resin which is usually non-crystalline and soluble in an organic solvent (in particular, a common solvent in which a plurality of resins can be dissolved) can be used. In particular, a resin having the excellent moldability, film-forming property, transparent and weather resistance, for example, styrenic resins, (meth) acrylic resins, alicyclic olefinic resins, polyester-series resins, cellulose derivatives (e.g., cellulose esters) are preferred.

A plurality of polymers can be suitably used in combination. For example, in respect to a combination of a plurality of polymers, a cellulose derivative, in particular, a cellulose ester (e.g., a cellulose $C_{2-4}$alkyl carboxylic acid ester such as cellulose diacetate, cellulose triacetate, cellulose acetate propionate and cellulose acetate butylate) is employed as at least one resin, and the cellulose derivative may be combined with the other resins.

The glass transition temperature can be selected within the range of about −100° C. to 250° C., preferably about −50° C. to 230° C., more preferably about 0 to 200° C. (e.g., about 50 to 180° C.). Incidentally, it is advantageous from the viewpoint of strength and rigidity of a sheet that the glass transition temperature of at least one polymer among the constituting polymers is not less than 50° C. (e.g., about 70 to 200° C.), preferably not less than 100° C. (e.g., about 100 to 170° C.). The weight-average molecular weight can be selected within not more than 1,000,000 (e.g., about 10,000 to 1,000,000), preferably about 10,000 to 700,000.

According to the present invention, since the wet phase separation process by evaporating or removing a solvent from a liquid phase containing a plurality of polymers to spinodal decomposition is adopted, a light-scattering layer which has substantially isotropic bicontinuous phase structure can be formed regardless of compatibility of a plurality of resins in principle. Therefore, a plurality of polymers which are compatible with each other are used in combination, but for the purpose of controlling a phase separation structure by spinodal decomposition with ease to form a bicontinuous phase structure efficiently, a plurality of resins which are incompatible (phase separable) with each other are combined in many cases.

A plurality of polymers can comprise a first polymer and a second polymer in combination. The first and second polymers each may comprise a sole resin or plural resins. The combination of the first and second polymers is not particularly limited. For example, when the first polymer is a cellulose derivative (e.g., a cellulose ester such as cellulose acetate propionate), the second polymer may be a styrenic resin (e.g., polystyrene, styrene-acrylonitrile copolymer), a (meth)acrylic resin (e.g., polymethyl (meth)acrylate), an alicyclic olefinic resin (e.g., a polymer formed from norbornene as a monomer), a polycarbonate-series resin, a polyester-series resin (e.g., the above-mentioned poly$C_{2-4}$alkylene arylate-series copolyester) or the like.

The ratio of the first polymer to the second polymer can be selected within the range of, for example, the former/the latter=about 10/90 to 90/10 (weight ratio), preferably about 20/80 to 80/20 (weight ratio), more preferably about 30/70 to 70/30 (weight ratio), in particular about 40/60 to 60/40. When the proportion of one polymer is too large, volume ratio between the separated phases is inclined so that the intensity of the scattered light is declined. Incidentally, when the sheet comprises three or more resins, the amount of each resin can be usually selected within about 1 to 90% by weight (e.g., about 1 to 70% by weight, preferably about 5 to 70% by weight, more preferably about 10 to 70% by weight).

The light-scattering layer constituting the light-scattering sheet of the present invention has at least bicontinuous phase structure. The bicontinuous phase structure is sometimes referred to as a bicontinuous structure or as a three-dimensionally continuous or conjugated structure and means a structure in which at least two kinds of constituent polymer phases are continuous (network structure). It is sufficient that the light-scattering layer has at least bicontinuous structure. Thus, the layer may have a structure such that a bicontinuous structure and a droplet structure (an independent or isolated phase structure) are intermingled. In the spinodal decomposition, with the progress of phase separation, the polymers form a bicontinuous phase and on further proceeding phase separation, the continuous phase becomes discontinuous owing to its own surface tension to assume a liquid droplet phase structure (an islands-in-an ocean structure composed of independent beads or spheres). Therefore, according to the degree of phase separation, an intermediate structure between a bicontinuous phase and a droplet phase structure, that is to say a meso-phase structure corresponding to a transition from the bicontinuous phase to the droplet phase can be formed. In the context of the present invention, the above intermediate structure is also subsumed in the concept of bicontinuous phase structure. When the phase structure is a composite structure composed of a bicontinuous phase and a droplet structure, the proportion of the droplet phase (isolated polymer phase) may for example be not more than 30% (by volume), preferably not more than 10% (by volume). The configuration of the bicontinuous phase structure is not particularly restricted but may be a network structure, particularly a random network structure.

The above-mentioned bicontinuous phase structure is substantially isotropic, with anisotropy having been diminished, within the layer or sheet plane. The term "isotropy" means that the average interphase distance of bicontinuous phase structure is uniform in all directions within the sheet plane.

The bicontinuous phase structure usually have a regularity of interphase distance (the distance between identical phases). Because of this, the light incident on the sheet gives a transmitted and scattered light directed in a specific direction due to Bragg reflection. Therefore, even when the sheet is built into a reflecting type liquid crystal display unit, the transmitted and scattered light can be directed in a given direction to remarkably brighten the display screen so that the trouble which could not be overcome with the conventional particle-dispersion type transmitting scattering sheet, that is an imaging (configuration) of the light source (e.g. a fluorescent tube) on the panel, can be avoided.

Furthermore, in the light-scattering sheet, the average interphase distance of the bicontinuous phase may for example be about 0.5 to 20 μm (e.g., about 1 to 20 μm), preferably about 1 to 15 μm (e.g., about 1 to 10 μm). When the average interphase distance is too small, it is difficult to impart high light-scattering intensity. When the average interphase distance is too large, the directionality of transmitted and scattered light is decreased.

Incidentally, the average interphase distance of the bicontinuous layer can be measured by image processing of a photomicrogram (e.g., a transmission microscopic, a phase-contrast microscopic, a confocal laser microscopic picture). An alternative method comprises measuring the scattering angle θ giving a maximal intensity of scattered light by the same procedure as that for evaluating the directionality of scattered light which will be described hereinafter and calculating the average interphase distance d of the bicontinuous layer from the following Bragg reflection equation.

$$2d \cdot \sin(\theta/2) = 1$$

wherein d denotes an average interphase distance of the bicontinuous layer, θ denotes a scattering angle, and λ denotes a wavelength of light).

Figure 2:
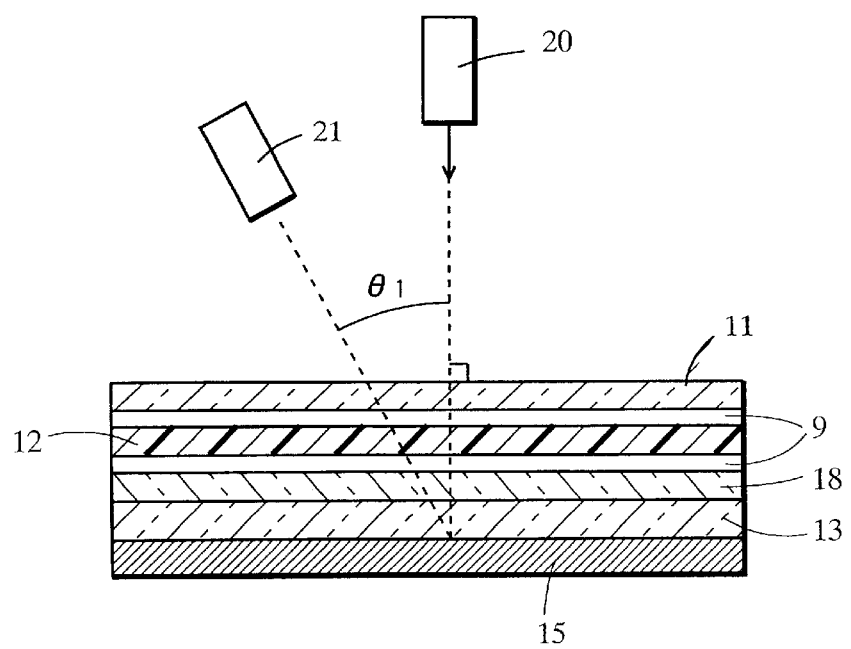
FIG. 2 is a schematic diagram explaining the method for evaluating the directionality of a light-scattering sheet.

When a light-scattering sheet of the above bicontinuous phase structure is used, not only a transmitted light can be highly scattered (high light-scattering properties) but a high order of directionality can be imparted to transmitted and scattered light. The directionality of scattered light can be measured, for example, by using a reflecting type LCD model unit comprising a laminate sheet in which a polarizing plate 11, a light-scattering sheet 12 and a color filter 18 are laminated in order via a vinyl acetate-series adhesive 9, a glass sheet (thickness: 1 mm) 13 and an aluminum reflector 15 as laminated as illustrated in FIG. 2. In the model unit, the polarizing plate 11 is located on front side and the aluminum reflector is located on back side. Thus, by irradiating this reflecting type LCD model unit perpendicularly from the front side using a laser beam illuminator (Nihon Kagaku ENG NEO-20 MS) 20, the intensity of reflected light is detected at the scattering angle θ1 and the intensity distribution of reflected light (the distribution of scattering light) can be determined. With a transmittable light-scattering sheet of the present invention, in contrast to a light-scattering sheet showing a Gaussian distribution of reflected light centered around θ1=0°, an intense maximum distribution is obtained in the given direction (for example, θ1=1 to 60° (e.g. 2 to 40°), preferably 5 to 30°, more preferably 10 to 20°), and the high directionality is obtained.

Figure 3:
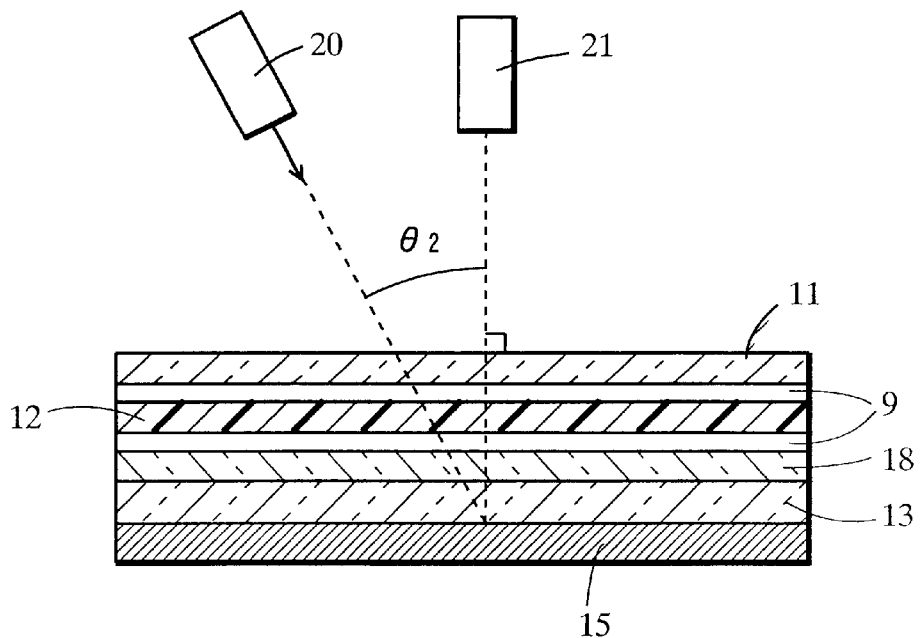
FIG. 3 is a schematic diagram explaining the method for measuring the intensity of reflected light incident from inclined direction.

The brightness of display illuminated from an oblique direction with the use of the above model unit can be evaluated by means of a unit shown by FIG. 3. That is, the intensity of reflected light illuminated from an oblique direction can be determined by illuminating the reflecting type LCD model unit from an oblique direction with an angle θ2 to the front side of the unit using a laser beam illuminator (Nihon Kagaku ENG NEO-20 MS) 20 and detecting the intensity of reflected light emerging perpendicularly from the front by detector 21.

Figure 4:
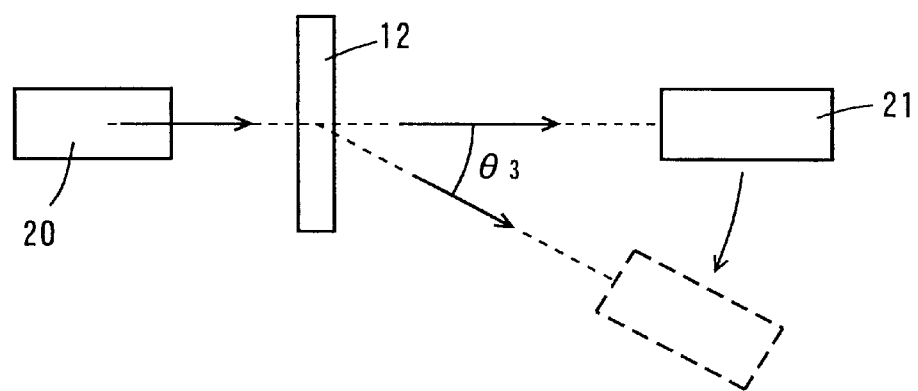
FIG. 4 is a schematic diagram explaining the method for measuring the intensity of transmitted and scattered light in the light-scattering sheet.

Further, in the light-scattering sheet, the relationship between the light-scattering intensity and scattering angle can be determined with a unit shown by FIG. 4 (a schematic diagram explaining the method of measuring the intensity of scattered light). Thus, from a laser beam illuminator (Nihon Kagaku ENG NEO-20 MS) 20 installed behind the light-scattering sheet 12, a laser beam is projected against the light-scattering sheet 12. The laser beam is transmitted with being diffused by the light-scattering sheet 12 and emerges from the front side of the light-scattering sheet 12. By detecting the intensity of the transmitted and scattered light corresponding to the scattering angle θ3 with a detector 21, the intensity of the scattering light can be determined. As such a unit, the automatic laser light-scattering meter (manufactured by Japan Science & Engineering) can be utilized.

The total light transmittance (transparency) of the light-scattering sheet is, for example, about 70 to 100%, preferably about 80 to 100%, more preferably about 90 to 100%. Incidentally, the total light transmittance can be measured by a hazeometer (manufactured by Nippon Densyoku Kogyo Co. Ltd., NDH-300A).

Incidentally, the light-scattering sheet may comprise a light-scattering layer alone, and may be a laminated sheet comprising a transparent support (a substrate sheet or film) and a light-scattering layer laminated on at least one side of the support.

As a resin constituting the transparent support (substrate sheet), the resin similar to that of the light-scattering layer can be used. As the preferred resin constituting the transparent support, there may be mentioned, for example, cellulose derivatives (e.g., a cellulose acetate such as cellulose triacetate (TAC) and cellulose diacetate), polyester-series resins (e.g., polyethylene terephthalate (PET), polybutylene terephthalate (PBT), polyarylate-series resins), polysulfone-series resins (e.g., polysulfone, polyether sulfone (PES)), polyether ketone-series resins (e.g., polyether ketone (PEK), polyether ether ketone (PEEK)), polycarbonate-series resins (PC), polyolefinic resins (e.g., polyethylene, polypropylene), a cyclic polyolefinic resins (e.g., ARTON, ZEONEX), halogen-containing resins (e.g., vinylidene chloride), (meth)acrylic resins, styrenic resins (e.g., polystyrene), vinyl ester or vinyl alcohol-series resins (e.g., polyvinyl alcohol). The transparent support may be stretched monoaxially or biaxially, and the transparent support having an isotropy optically is preferred. The preferred transparent support is a support sheet or film having low birefringence. The optically isotropic transparent support includes non-stretched sheet or film, and includes a sheet or film composed of, for example, polyesters (e.g., PET, PBT), cellulose esters, in particular cellulose acetates (e.g., cellulose acetate such as cellulose diacetate and cellulose triacetate, cellulose acetate $C_{3-4}$alkylcarboxylic acid ester such as cellulose acetate propionate and cellulose acetate butylate) or the like.

The thickness of the light-scattering layer or the light-scattering sheet may be, for example, about 0.5 to 300 μm, preferably about 1 to 100 μm (e.g., about 10 to 100 μm), more preferably about 1 to 50 μm (e.g., about 5 to 50 μm, in particular, about 10 to 50 μm). When the thickness of the sheet is too small, the intensity of scattered light is decreased. When the sheet is too thick, scattering-ability is so great that directionality is sacrificed. Moreover, when the sheet is applied to a reflecting type liquid crystal display unit, the unit thickness and weight are increased, the displayed image grows dim and the displayed image definition is decreased. When the difference in refractive index between the constituent polymers is small, the sheet thickness is preferably relatively large, and when the difference in refractive index is large, the sheet thickness is preferably relatively small. Incidentally, when the light-scattering sheet comprises the transparent support and the light-scattering layer, the thickness of the light-scattering layer may be, for example, about 1 to 100 μm, preferably about 5 to 50 μm, more preferably about 10 to 30 μm.

Incidentally, the light-scattering layer or the light-scattering sheet having bicontinuous phase structure may be laminated on, for example, a member constituting a liquid crystal display unit (in particular, an optical member) such as a polarizing plate or an optical retardation plate for coloration and high-definition of a liquid crystal image, if necessary.

Incidentally, the light-scattering sheet may contain a variety of additives, for example, a stabilizer (e.g. antioxidant, ultraviolet rays absorber, heat stabilizer, etc.), a plasticizer, a colorant (a dye or a pigment), a flame retardant, an antistatic agent and a surfactant. Moreover, where necessary, various coating layers, such as an antistatic layer, an anti-fogging layer and a parting (release) layer may be formed on the surface of the light-scattering sheet.

Method of Producing a Light-scattering Sheet

The light-scattering sheet of the present invention (transmittable light-scattering sheet) can be produced by a wet spinodal decomposition method, i.e., the light-scattering layer or sheet can be produced by evaporating or removing a solvent from a liquid mixture containing a plurality of polymers differing in refractive index with each other to form a bicontinuous phase structure which is substantially isotropic due to spinodal decomposition. More concretely, the light-scattering sheet composed of the light-scattering layer alone can be produced by casting the liquid mixture on a release support, evaporating a solvent in the liquid mixture to cause phase separation due to spinodal decomposition, forming the light-scattering layer having the bicontinuous phase structure, fixing the layer, and peeling the light-scattering layer from the release support. Moreover, the light-scattering sheet comprising the transparent support (e.g., transparent substrate sheet) and the light-scattering layer can be produced by coating the liquid mixture on the transparent support, evaporating a solvent in liquid mixture to cause phase separation due to spinodal decomposition, forming a bicontinuous phase structure, and fixing the structure, or by laminating the light-scattering layer on the transparent support (transparent substrate sheet) by means of a laminate method such as adhesion.

The liquid mixture containing a plurality of polymers may be dispersion, but is usually used as a solution in which the polymers are dissolved in a common solvent (in particular, homogenous solution). Since the wet method is utilized for the spinodal decomposition in the present invention, the light-scattering layer having the bicontinuous phase structure can be formed regardless of compatibility of the constituting polymers in principle. Thus, the method can be effectively adopted to a polymer system which can not adopted to the dry spinodal decomposition method, for example, the constituting polymers which are not compatible with each other by kneading at a temperature of not more than decomposition temperature of the polymers. The above common solvent can be selected from solvents capable of dissolving each polymer according to the species and the solubility of the polymers, and may be, for example, water, an alcohol (e.g., ethanol, isopropanol, butanol, cyclohexanol), an aliphatic hydrocarbon (e.g., hexane), an alicyclic hydrocarbon (e.g., cyclohexane), an aromatic hydrocarbon (e.g., toluene, xylene), a halogenated hydrocarbon (e.g., dichloromethane, dichloroethane), an ester (e.g., methyl acetate, ethyl acetate, butyl acetate), an ether (e.g., dioxane, tetrahydrofurane), a ketone (e.g., acetone, methyl ethyl ketone, methyl isobutyl ketone), a cellosolve (e.g., methyl cellosolve, ethyl cellosolve), a cellosolve acetate, a sulfoxide (e.g., dimethyl sulfoxide), an amide (e.g., dimethylformamide, dimethylacetoamide), and the solvent may be a mixed solvent.

After the liquid mixture is cast or coated, a spinodal decomposition can be carried out by evaporating or removing a solvent at a temperature of less than a boiling point of the solvent (e.g., a temperature lower than a boiling point of the solvent by about 1 to 120° C., preferably about 5 to 50° C., in particular about 10 to 50° C.) to cause the phase separation of a plurality of polymers. The removal of the solvent can be usually carried out by drying, for example drying at an temperature of about 30 to 100° C., preferably about 40 to 80° C. according to the boiling point of the solvent.

The concentration of a solute (polymer) in liquid mixture can be selected within the range causing the phase-separation and not deteriorating castability and coating property, and is, for example, about 1 to 40% by weight, preferably about 2 to 30% by weight (e.g., about 2 to 20% by weight), more preferably about 3 to 15% by weight, and is usually about 5 to 25% by weight. When the polymer concentration is too high, the control of phase separation is difficult. When the polymer concentration is too low, the castability and coating ability tend to deteriorate.

The bicontinuous phase structure formed by spinodal decomposition can be fixed by cooling to a temperature of not more than a fixing temperature or a glass transition temperature of the constituting polymer (e.g., not more than a glass transition temperature of the main polymer).

The bicontinuous phase structure can be formed by a simple operation of removal and dryness of a solvent without heating treatment at high temperature because of utilizing spinodal decomposition caused by evaporating a solvent.

Incidentally, the liquid mixture is coated on a transparent support, and the transparent support sometimes dissolves or swells according to the species of solvents. For example, when a coating liquid (homogenous solution) containing a plurality of resins is coated on triacetylcellulose film, the coating surface of triacetylcellulose film sometimes elutes, corrodes, or swells according to the species of solvents. In this case, it is advantageous that a coating surface of the transparent support (e.g., triacetylcellulose film) is previously applied with a coating agent for solvent resistance to form an optically isotropic coating layer for solvent resistance. The coating layer can be formed with, for example, thermoplastic resins such as AS resin, polyester-series resins, and polyvinyl alcohol-series resins (e.g., polyvinyl alcohol, ethylene-vinyl alcohol copolymer), curable resins such as epoxy resins, silicone-series resins, and ultraviolet rays-curable resins, hard-coating agents or the like.

Incidentally, when a mixture liquid or coating liquid containing a plurality of polymers is coated on a transparent support, a solvent in which the transparent support does not dissolve, corrode or swell may be selected according to the species of the transparent support. For example, when triacetylcellulose film is employed as the transparent support, tetrahydrofuran, methyl ethyl ketone or the like is used as a solvent for the liquid mixture or the coating liquid and thus the light-scattering layer having a bicontinuous phase structure can be formed without deteriorating properties of the film.

Liquid Crystal Display (LCD) Unit or Device

The transmittable light-scattering sheet of the present invention is applied to a reflective liquid crystal display unit or apparatus equipped with a reflecting means, in particular, a reflective liquid crystal display unit equipped with a reflecting means and a polarizing means. For example, the liquid crystal display unit is not limited to a one polarizing plate-type reflective LCD unit with one polarizing plate, and may be a two polarizing plates-type reflective LCD unit with two polarizing plates varying in polarizing property. The reflective LCD unit utilizing one polarizing plate may be a reflective LCD unit combining one polarizing plate with a variety of modes (e.g. the mode using a twisted nematic liquid crystal, a R-OCB (optically compensated bend) mode, a parallel alignment mode, etc.).

Moreover, the light-scattering sheet of the present invention can be also applied to a reflective LCD unit utilizing the wavelength selectivity in the reflection property of a chiral nematic liquid crystal.

FIG. 1 is a schematic cross-section view showing an example of the reflective LCD unit. This LCD unit comprises a liquid crystal cell 6 having a liquid crystal (e.g., liquid crystal layer) 4 sealed between a pair of transparent substrates (e.g., glass plate, plastic) 3a, 3b, a reflecting means (e.g., a reflective layer such as specular reflecting plate) 5 laminated on one transparent substrate (back substrate) 3a of the transparent substrates 3 constituting the liquid crystal cell, a light-scattering sheet 2 laminated on the other transparent substrate (front substrate) 3b constituting the liquid crystal cell 6 via a coloring means for color display (e.g., a color filter) 8, and a polarizing means (e.g., a polarizing layer such as polarizing plate) 1 for polarizing a light reflected by the reflecting means 5, which is laminated on the light-scattering sheet. Transparent electrodes (not shown) are formed on the opposed surfaces of the pair of transparent substrates 3a and 3b.

In such a reflective LCD unit, a light incident from a front surface 7 on the viewer side (a incident light) is transmitted and diffused through the light-scattering sheet and reflected by the reflecting means 5, and the reflected light is rescattered through the light-scattering sheet 2. Particularly, the transmitted and scattered light has directionality. Therefore, in the reflective LCD unit having the light-scattering sheet 2, the reflected light can be scattered with high light-scattering ability, and the directionality can be imparted in the reflected light intensity. Thus, a whole display screen can be brightened. Further, the sufficient brightness can be ensured even in color display, and the sharp color image can be exhibited in the color display-type reflective LCD unit.

Incidentally, in the liquid crystal display unit, the position for disposing the light-scattering sheet having bicontinuous phase structure is not particularly limited as far as a reflecting means for reflecting an incident light toward back side of the liquid crystal cell is disposed and the light-scattering sheet is disposed forwardly of the reflecting means. Moreover, it is sufficient that the polarizing plate may be disposed on a light path (incident path and emerge path). The position for disposing the polarizing means and the light-scattering sheet is not particularly limited and the light-scattering sheet may be disposed forwardly of the polarizing means. In the preferred embodiment, in order to illuminate a display screen by the polarizing means, the polarizing plate is disposed forwardly of the liquid crystal cell, and the light-scattering sheet is disposed between the liquid crystal cell and the polarizing plate.

The reflecting means can be formed with a thin film such as vapor deposition film made of aluminum, and a transparent substrate, a color filter, a light-scattering sheet, and a polarizing plate may be laminated with an adhesive layer. That is, the light-scattering sheet of the present invention may be used with laminating the other functional layer (e.g., a polarizing plate, an optical retardation plate, light-reflecting plate, a transparent conductive layer). Incidentally, when the reflective LCD unit is employed as a monochrome display unit, the above color filter is not always required.

Moreover, an optical retardation plate may be disposed in an STN (Super Twisted Nematic) liquid crystal display unit, though this is not indispensable in a TFT liquid crystal display unit. The optical retardation plate may be disposed on a suitable position, for example, between the front transparent substrate and the polarizing plate. In this unit, the light-scattering sheet may be interposed between the polarizing plate and the optical retardation plate, and may be interposed between the front transparent substrate and the optical retardation plate.

By using the light-scattering sheet of the present invention, high scattering ability and directionality can be imparted to a reflected light so that the visibility of liquid crystal display screen can be improved. Therefore, the reflective LCD unit can be utilized broadly in the display segments of electrical and electronic products such as personal computers, word processors, liquid crystal televisions, chronometers, desktop calculators. Especially, it is preferably utilized in a liquid crystal display unit of a portable information terminal.

According to the present invention, a transmittable light-scattering sheet having substantially isotropic bicontinuous phase structure can be produced with low cost by spinodal decomposition from a liquid phase. The transmittable light-scattering sheet is used so that diffusibility and further high directionality can be imparted to a reflected light. Therefore, even in a color display unit, the display screen of the reflective LCD unit can be significantly illuminated.

EXAMPLES

The following examples illustrate the present invention in further detail without defining the scope of the invention.

Example 1

Into 94 parts by weight of tetrahydrofuran (THF) were dissolved 3.6 parts by weight of cellulose acetate propionate (acetylation degree of 2.5%, propylation degree of 46%, number average molecular weight in terms of polystyrene of 75000; manufactured by Eastman, CAP-482-20) and 2.4 parts by weight of copolyester (fluorene-modified polyester (OPET); manufactured by Kanebo Co, Ltd., OP7-40). The solution was cast on triacetylcellulose film with wirebar #24, followed by standing in an oven at 60° C. for 2 minutes for evaporating THF to form a coating layer (thickness of about 2 $\mu$m). When examined with a transmission light microscope, the sheet thus obtained was found to have a bicontinuous phase structure. Total light transmittance was measured with a hazemeter (Nihon Denshoku Kogyo, NDH-300A) in accordance with JIS K7105, and was 91%.

Example 2

Into 93 parts by weight of tetrahydrofuran (THF) were dissolved 4.2 parts by weight of cellulose acetate propionate (acetylation degree of 2.5%, propylation degree of 45%, number average molecular weight in terms of polystyrene of 75000; manufactured by Eastman, CAP-482-20) and 2.8 parts by weight of copolyester (fluorene-modified polyester (OPET); manufactured by Kanebo Co, Ltd., OP7-40). The solution was cast on triacetylcellulose film with wirebar #24, followed by standing in an oven at 60° C. for 2 minutes for evaporating THF to form a coating layer (thickness of about 2 $\mu$m). When examined with a transmission light microscope, the sheet thus obtained was found to have a bicontinuous phase structure. Total light transmittance was 91%.

Example 3

Into 95 parts by weight of acetone were dissolved 3 parts by weight of cellulose acetate propionate (acetylation degree of 2.5%, propylation degree of 46%, number average molecular weight in terms of polystyrene of 25000; manufactured by Eastman, CAP-482-0.5) and 2 parts by weight of styrene-acrylonitrile copolymer (content of acrylonitrile of 33.3% by weight, number average molecular weight of 30000; manufactured by Technopolymer Co, Ltd., 290ZF). The solution was cast on triacetylcellulose film, which had been previously coated with polyvinyl alcohol, with wirebar #20, followed by standing at room temperature for 3 minutes for evaporating acetone to form a coating layer (thickness of about 2 $\mu$m). When examined with a transmission light microscope, the sheet thus obtained was found to have a bicontinuous phase structure. Total light transmittance was 83%.

Example 4

Into 91 parts by weight of acetone were dissolved 5 parts by weight of cellulose acetate propionate (acetylation degree of 2.5%, propylation degree of 46%, number average molecular weight in terms of polystyrene of 75000; manufactured by Eastman, CAP-482-20) and 4 parts by weight of styrene-acrylonitrile copolymer (content of acrylonitrile of 33.3% by weight, number average molecular weight of 56000; manufactured by Technopolymer Co, Ltd., SAN-T). The solution was cast on triacetylcellulose film, which had been previously coated with polyvinyl alcohol, with wirebar #20, followed by standing at room temperature for 3 minutes for evaporating acetone to form a coating layer (thickness of about 2 $\mu$m). When examined with a transmission light microscope, the sheet thus obtained was found to have a bicontinuous phase structure. Total light transmittance was 81%.

Comparative Example 1

Into 90 parts by weight of a mixed solvent of methylene chloride/methanol (9/1; the ratio by weight) was dissolved 70 parts by weight of cellulose acetate (manufactured by Daicel Chemical Industries Ltd., LT-105). To the solution was added 30 parts by weight of crosslinked polymethyl methacrylate(PMMA)-series fine particle (manufactured by Sekisui Kagaku Co. Ltd., MBX-2), and cast to 50 $\mu$m thick of sheet. When examined with a transmission light microscope, the sheet thus obtained was found to have a random droplet phase structure. The mean droplet diameter was 3.0 $\mu$m and the total light transmittance of the sheet was 92%.

The Evaluation of Light-scattering Characteristic (1) Transmittable Scattering Characteristic of Light-scattering Sheet Using the automatic laser light-scattering meter (manufactured by Japan Science & Engineering) shown in FIG. 4, the relationship between the light-scattering intensity and scattering angle of the light-scattering sheet obtained in Examples 1 to 4 and Comparative Example 1 was determined by light being incident on the sheet in a perpendicular direction.

Figure 5:
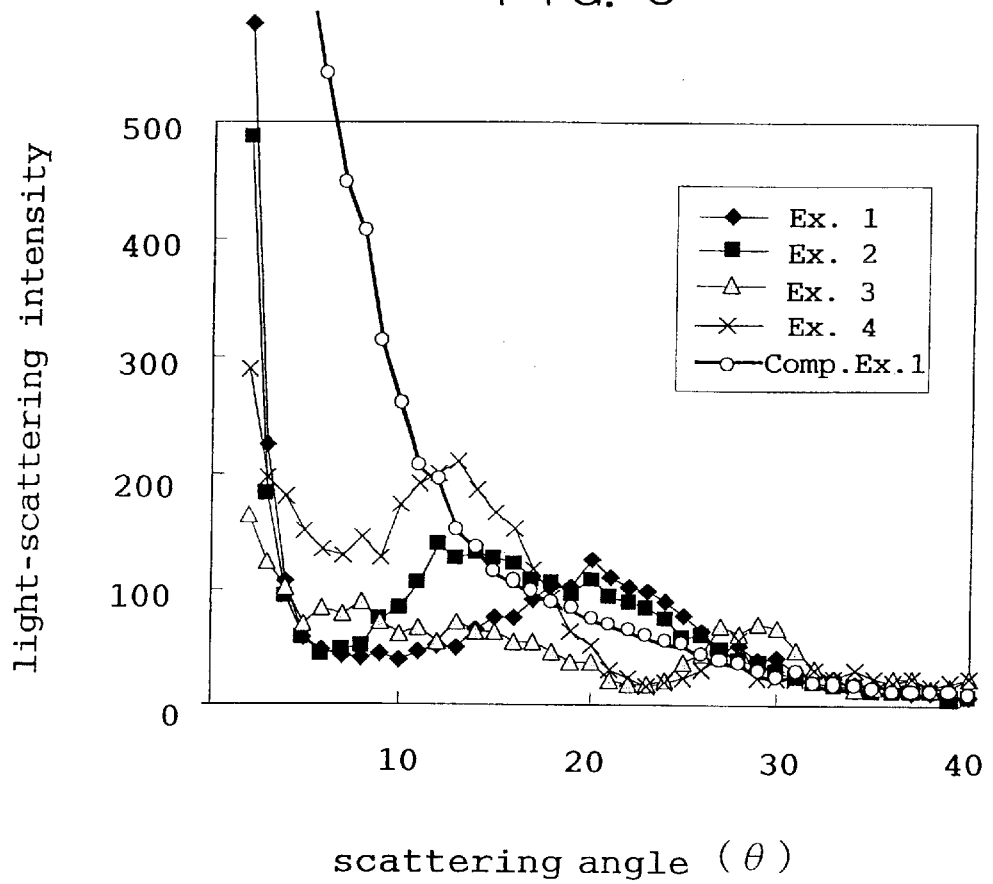
FIG. 5 is a graph for indicating the relationship between the light-diffusing intensity and scattering angle of Examples and Comparative Examples.

The result is shown in FIG. 5. As apparent from FIG. 5, the sheet of Comparative Example 1 having random droplet phase structure expresses Gaussian-type light-scattering intensity. On the other hand, in the sheets of Examples, scattered lights were directed in the specific angles (about 21° in Example 1, about 12° in Example 2, about 29° in Example 3, about 13° in Example 4).

(2) Brightness of Display

Reflecting type LCD model units shown in FIG. 3 was constructed with the light-scattering sheet obtained in Examples 1 to 4 and comparative Example 1. Each unit was illuminated with a white spot light from an oblique and upper direction and the intensity of light reflected in a perpendicular direction from the front side was measured (FIG. 3). The intensity of reflected light in the perpendicular direction for an angle of incidence (scattering angle θ2) was evaluated according to the following criteria.

A: considerably bright
B: bright
C: bright to dark

TABLE 1

| scattering angle θ2 | Ex. 1 | Ex. 2 | Ex. 3 | Ex. 4 | Comp. Ex. 1 |
|---|---|---|---|---|---|
| 10° | C | B | B | B | B |
| 15° | B | B | B | A | B |
| 20° | A | A | B | B | C |
| 25° | B | B | B | B | C |
| 30° | B | C | B | B | C |

As apparent from Table 1, in the transmittable light-scattering sheets of Examples 1 to 4, the intensity of reflected light at the specific scattering angle is strong and the reflected light has high directionality.

What is claimed is:

1. A light-scattering sheet comprising a light-scattering layer which comprises a plurality of polymers varying in refractive index and has at least bicontinuous phase structure, wherein the bicontinuous phase structure is formed by spinodal decomposition from liquid phase comprising a plurality of polymers, wherein an average interphase distance of the bicontinuous phase is 0.5 to 20 $\mu$m.

2. A light-scattering sheet according to claim 1, wherein an incident light is scattered isotropically, and the transmitted and scattered light has a maximum intensity of a scattered light at a scattering angle of 2 to 40° and a total light transmittance of 70 to 100%.

3. A light-scattering sheet according to claim 1, wherein a difference in refractive index between a plurality of polymers is 0.01 to 0.2.

4. A light-scattering sheet according to claim 1, wherein the light-scattering layer comprises a plurality of polymers selected from the group consisting of styrenic resins, (meth) acrylic resins, vinyl ester-series resins, vinyl ether-series resins, halogen-containing resins, alicyclic olefinic resins, polycarbonate-series resins, polyester-series resins, polyamide-series resins, silicone-series resins, cellulose derivatives and rubbers or elastomers.

5. A light-scattering sheet according to claim 1, wherein the light-scattering layer comprises a plurality of polymers which are non-crystalline and soluble in a common solvent.

6. A light-scattering sheet according to claim 1, wherein the light-scattering layer comprises at least a cellulose ester.

7. A light-scattering sheet according to claim 6, wherein the cellulose ester comprises an ester of $C_{2-4}$alkylcarboxylic acid with cellulose.

8. A light-scattering sheet according to claim 1, wherein the light-scattering layer comprises a first polymer and a second polymer, and the weight ratio of the first polymer to the second polymer is 10/90 to 90/10.

9. A light-scattering sheet according to claim 8, wherein the first polymer comprises a cellulose derivative, and the second polymer comprises at least one polymer selected from the group consisting of styrenic resins, (meth)acrylic resins, cyclic olefinic resins, polycarbonate-series resins and polyester-series resins.

10. A light-scattering sheet according to claim 1, which comprises a transparent support and the light-scattering layer formed on at least one side of the support.

11. A light-scattering sheet according to claim 10, wherein the transparent support is optically isotropic.

12. A light-scattering sheet according to claim 10, wherein the transparent support comprises a cellulose acetate film.

13. A reflective liquid crystal display unit which comprises a liquid crystal cell having a liquid crystal sealed therein, a reflecting means for reflecting an incident light disposed behind the liquid crystal cell, and a light-scattering sheet recited in claim 1 disposed forwardly of the reflecting means.

14. A reflective liquid crystal display unit according to claim 13, wherein a polarizing plate is disposed forwardly of the liquid crystal cell, and said light-scattering sheet is disposed between the liquid crystal cell and the polarizing plate.

15. A light scattering sheet according to claim 1, wherein said plurality of polymers comprises a combination of a cellulose ester and other resins selected from the group consisting of styrenic resins, (meth)acrylic resins, vinyl ester resins, vinyl ether resins, halogen-containing resins, alicyclic olefinic resins, polycarbonate resins, polyester resins, polyamide resins, silicone resins and rubbers or elastomers.

16. A light scattering sheet according to claim 1, wherein the bicontinuous phase structure comprises an islands-in-an ocean structure composed of independent beads or spheres.

17. A light scattering sheet according to claim 1, wherein the bicontinuous phase structure is substantially isotropic.

* * * * *